(12) United States Patent
Brown

(10) Patent No.: US 9,506,484 B2
(45) Date of Patent: Nov. 29, 2016

(54) FLOW CONDITIONER AND METHOD FOR OPTIMIZATION

(71) Applicant: Gregor J. Brown, Prestwick (GB)

(72) Inventor: Gregor J. Brown, Prestwick (GB)

(73) Assignee: Cameron International Corporation, Houston, TX (US)

( * ) Notice: Subject to any disclaimer, the term of this patent is extended or adjusted under 35 U.S.C. 154(b) by 0 days.

(21) Appl. No.: 13/896,947

(22) Filed: May 17, 2013

(65) Prior Publication Data

US 2014/0338771 A1 Nov. 20, 2014

(51) Int. Cl.
*F15D 1/02* (2006.01)
*G06F 17/50* (2006.01)

(52) U.S. Cl.
CPC ............ *F15D 1/025* (2013.01); *G06F 17/5086* (2013.01); *G06F 2217/34* (2013.01)

(58) Field of Classification Search
CPC ..... F16L 55/02718; F15D 1/025; G01F 1/42
USPC ..................... 138/44, 41, 37, 39; 73/861.79; 366/336–338, 340
See application file for complete search history.

(56) References Cited

U.S. PATENT DOCUMENTS

| | | | | |
|---|---|---|---|---|
| 3,840,051 A | * | 10/1974 | Akashi et al. | 138/37 |
| 5,341,848 A | * | 8/1994 | Laws | 138/44 |
| 5,495,872 A | * | 3/1996 | Gallagher et al. | 138/44 |
| 5,529,093 A | * | 6/1996 | Gallagher et al. | 138/44 |
| 5,762,107 A | * | 6/1998 | Laws | 138/44 |
| 6,138,519 A | * | 10/2000 | Bergervoet et al. | 73/861.79 |
| 6,145,544 A | * | 11/2000 | Dutertre et al. | 138/39 |
| 7,958,910 B2 | * | 6/2011 | Nakamori et al. | 138/44 |
| D721,417 S | * | 1/2015 | Sawchuk et al. | D23/213 |
| 2004/0074537 A1 | * | 4/2004 | Roots | 137/487.5 |
| 2006/0096650 A1 | * | 5/2006 | Sawchuk et al. | 138/39 |

* cited by examiner

*Primary Examiner* — Patrick F Brinson
(74) *Attorney, Agent, or Firm* — Ansel M. Schwartz

(57) ABSTRACT

A flow conditioner for a circular pipe having an axis. The flow conditioner includes a plate having a face to be disposed in the circular pipe with the face of the plate perpendicular to the axis of the pipe. The plate has a central circular passage area through which fluid flows surrounded by two or more concentric arrays of segmented annular passages for fluid flow defined by separating and subdividing ligaments, with at least one subdividing ligament having a width different than a width of a second subdividing ligament. Alternatively, or in addition, there is at least one array of annular passages having a radial width different than a radial width of a second array of annular passages and at least one subdividing ligament having a width different than a width of a second subdividing ligament. A method of producing an optimized geometry of flow conditioner for a circular pipe having an axis.

21 Claims, 12 Drawing Sheets

US 9,506,484 B2

FLOW CONDITIONER AND METHOD FOR OPTIMIZATION

FIELD OF THE INVENTION

The present invention is related to a flow conditioner for flow regarding a flow metering device. (As used herein, references to the "present invention" or "invention" relate to exemplary embodiments and not necessarily to every embodiment encompassed by the appended claims.) More specifically, the present invention is related to a flow conditioner for a flow metering device where the conditioner has a central circular passage area through which fluid flows surrounded by two or more concentric arrays of segmented annular passages for fluid flow defined by separating and subdividing ligaments.

BACKGROUND OF THE INVENTION

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

In the field of flow measurement, it is often necessary to condition the flow upstream of a flow metering device in order that the flow meter will register flow with a minimal error. Bends, valves, filters and other forms of pipeline component distort the flow velocity profile and by changing the flow direction introduce non-axial velocity components or 'swirl' in the flow stream. It is well known that the calibration or flow coefficient of certain types of flow meter is affected by distortions of the profile and/or by the presence of swirl. Flow conditioners have been employed for many years to partially rectify distorted and swirling flows upstream of flow meters. The various devices deployed to date differ in design with resulting differences in performance in terms of their ability to rectify flow versus the permanent pressure loss that they impose. Most conditioners have a single specified geometry or a constrained set of design parameters and cannot easily be adapted to suit the requirements of a particular situation. The invention described here aims to overcome these and other limitations of existing conditioners.

Flow conditioners have been used for many years to attempt with the aim of rectifying incoming flow conditions and improving flow meter accuracy. By far the most common type of flow conditioner has been a 'flow straightener' of either the vane type or in the form of a tube bundle assembly. Flow straighteners essentially divide the flow into a number of passages that are long and straight in parallel with the axis of the pipe. The aim is that any rotational component of velocity is reduced or eliminated when the flow exits the conditioner.

The tube bundle is the most commonly employed form of flow straightener, having been standardized to some degree, and is essentially an assembly of tubes, typically between 7 and 55 in total, arranged either in a hexagonal or circular geometry, as illustrated in FIGS. 1a and 1b. A tube bundle using 19 tubes of equal size arranged in a circular geometry is included in the International Standard for differential pressure flow meters, 1505167. Tube bundles are typically made to be between two and three pipe diameters in length, with the result that the tubes may be 20 to 30 tube diameters long, though studies have shown that in terms of limiting swirl, a much shorter length of bundle can still be effective.

A recognized deficiency of the tube bundle design of flow conditioner is that while it is effective at removing swirl, the emerging axial velocity profile does not tend to be fully developed, that is it generally tends to be flatter than the profile that would be found downstream of a long straight length of pipe at the Reynolds number of interest. In order to try to overcome this limitation, Stuart developed a tube bundle flow conditioner where the tube diameters used within the bundle were varied in order to produce a velocity profile shape closer to the desired fully developed profile. A disadvantage of this conditioner design in terms of manufacturing, which also applies to most tube bundle designs, is that when pipe diameter is varied, the required tube diameters may not be readily available in standard sizes of tubing. The main advantage of tube bundles is that they have relatively low permanent pressure loss, having a loss coefficient for fully turbulent flow in the range of 0.65 to 1.2.

A further disadvantage of the tube bundle is its variable design and quality. If not constructed to the ISO standard, the potential variations in number and size of tubes are almost endless, making it difficult to predict performance or relate experience from one design of tube bundle to another. Furthermore, variable manufacturing quality means that the tube alignment may vary, and in some cases, for example if the bundle becomes twisted during manufacture, the bundle can produce a swirling flow.

The need to shape the axial velocity profile as well as remove swirl was probably first addressed properly in the design of the Zanker flow conditioner. The Zanker conditioner comprises a thin plate with holes designed to produce a graded resistance to flow combined with a vane type straightener attached to the downstream side of the plate. In terms of the flow profile produced and level of swirl reduction achieved by this conditioner, it is recognized as being very effective. However, it is somewhat difficult to manufacture and has a high pressure loss coefficient of greater than 5.

More commonly used today are thick-plate type conditioners. In these designs a graded resistance to flow is achieved by means of making circular passages in a fairly thick plate. By varying the number, spacing and/or size of the circular passages, the desired graded resistance is achieved. Examples of this type of conditioner include those by Laws (most common in the Nova/CPA 50E variant), Spearman, and Gallagher, in addition to the thick plate version of the Zanker conditioner, where the thicker plate negates the requirement for the downstream vane-type straightener. Common thick-plate conditioners are illustrated in FIGS. 2a-2d.

These thick-plate conditioners with circular passages are considered the current state-of-the-art but still have certain deficiencies. Pressure loss coefficients are typically in the range of 2 to 5, greater than that available with a tube bundle. Attempts to produce plates of higher porosity and hence lower pressure loss have generally resulted in a reduction in flow conditioning performance.

Optimization of the design of a thick-plate conditioner with circular passages is complicated by particular issues associated with the chosen circular hole geometry. An irregular numbers of holes and the circular shape of the passages result in a complex 'water-shed' between adjacent rings of holes, and hence makes the calculation of the effective porosity difficult as the water-shed defines the blockage area associated with each hole. Optimization is further complicated in cases where the circular passage size is varied, as for a given thickness of plate as this results in variation of both the porosity and the ratio of the length of the passage to its hydraulic diameter. As a consequence, the steps that should be taken to optimize a conditioner with circular passages are not obvious, as when changes are made the shape of the water shed varies as well as the porosity and the hydraulic diameter.

A particular advantage of the thick-plate conditioner is that the manufacture and geometric scaling to different sizes of pipe can be achieved very easily, which overcomes the manufacturing and quality limitations associated with the tube bundle type of conditioner.

As mentioned previously, the effectiveness of thick-plate conditioners has been found to diminish when the porosity is increased too much, with the result that most thick-plate conditioners in use today have porosity in the region of 50%. When porosity has been increased, the investigators have not tended to increase plate thickness to compensate for the reduction in l/d, which may partly explain the diminished performance. This has led some designers to add straightening vanes to the conditioner or to employ two stages of conditioning, the first being a straightening vane and the second a graded thick-plate conditioner.

Some types of flow meter are more affected by the condition of the incoming flow field than others. In the case of multi-path ultrasonic flow meters, it is often the case that if swirl is removed effectively then the meter will be able to perform with high accuracy in a variety of different installation conditions. Therefore, it is common for tube bundles to be used with ultrasonic meters, owing to their lower pressure loss characteristics. However, this does not offset three of the disadvantages of tube bundles: first, that they alter the axial velocity profile in an adverse way; secondly the fact that they are generally manufactured to be between 2 and 3 diameters long, and thirdly the manufacturing issues mentioned above that can result in poor quality conditioners. Therefore, it is one purpose of the invention described here to be able to produce a low pressure loss flow conditioner for use with ultrasonic and other types of flow meters. In addition to having a low permanent pressure loss, the conditioner should be easy to manufacture in a reproducible way and it should be possible to vary the design parameters in order to obtain a desirable shape of axial velocity profile.

BRIEF SUMMARY OF THE INVENTION

The flow conditioner of the current invention is based on an arrangement of segmented annular passages, arranged symmetrically around the center-line of a circular conduit. The choice of segmented annular passages allows the cross-sectional area of the pipe to be divided into a predetermined number of annular rings with the width and separation of the passages to be freely varied in both radial and tangential directions, to obtain a desired value of hydraulic diameter and porosity in each ring. Combined with control over the length of the passages via selecting the thickness of the conditioner, this arrangement of segmented annular passages can be optimized to produce a conditioner which will retard swirl and have a desired radial distribution of resistance, in combination with a specified overall pressure loss.

BRIEF DESCRIPTION OF THE SEVERAL VIEWS OF THE DRAWING

In the accompanying drawings, the preferred embodiment of the invention and preferred methods of practicing the invention are illustrated in which.

DETAILED DESCRIPTION OF THE INVENTION

Figure 1A:
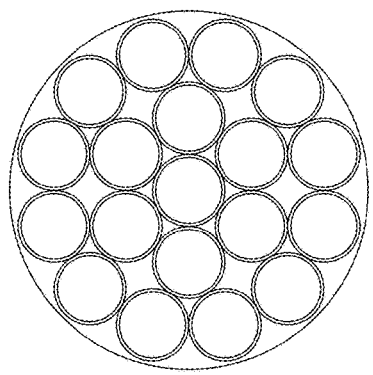
FIGS. 1a and 1b show two typical arrangements of 19-tube tube bundle conditioners.
Figure 1B:
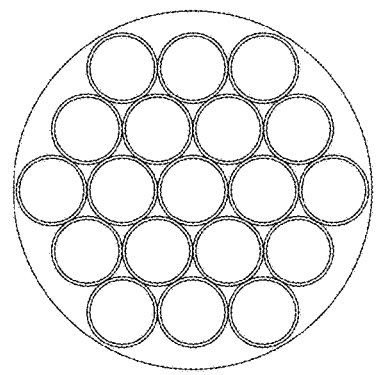
Figure 2A:
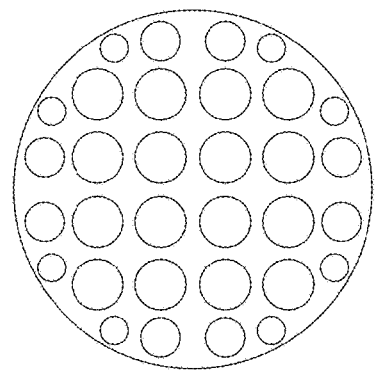
FIGS. 2a-2d show typical thick plate conditioner geometries.
Figure 2B:
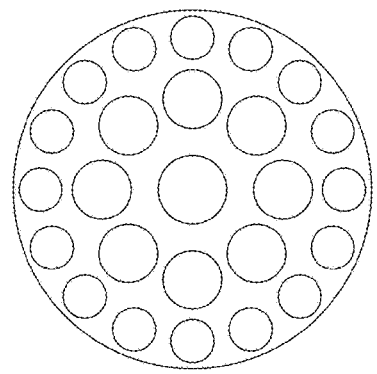
Figure 2C:
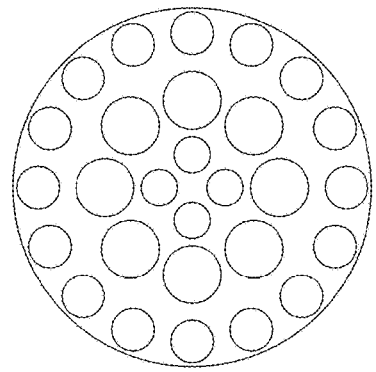
Figure 2D:
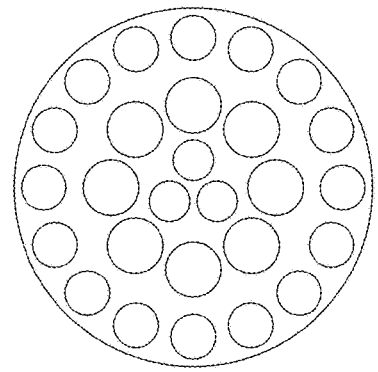
Figure 3:
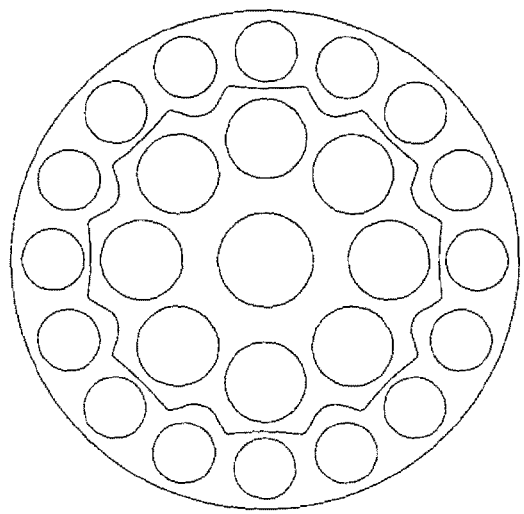
FIG. 3 is an illustration of a complicated water-shed geometry between the outer and middle rings when circular passages are used.
Figure 4A:
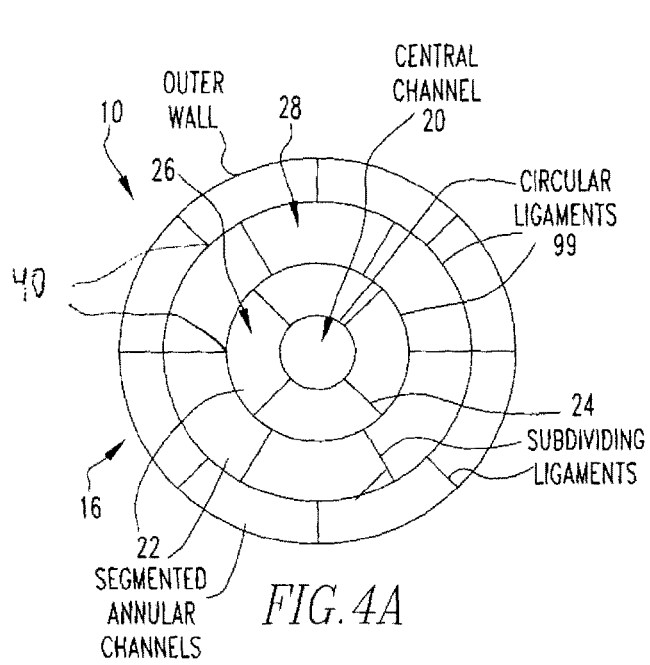
FIGS. 4a and 4b show a segmented annular geometry with circular central channel (three annular rings).
Figure 4B:
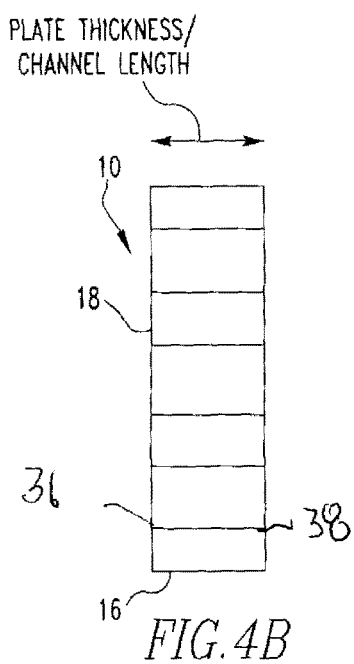
Figure 5A:
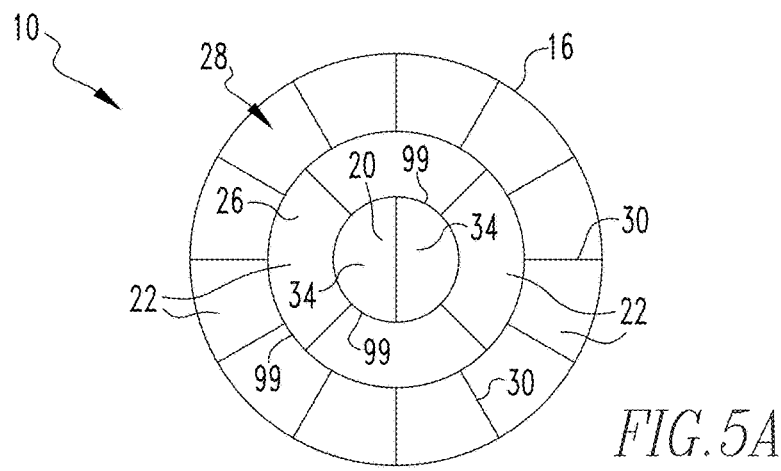
FIG. 5a shows a segmented annular geometry with segmented central channel (two annular rings).
Figure 5B:
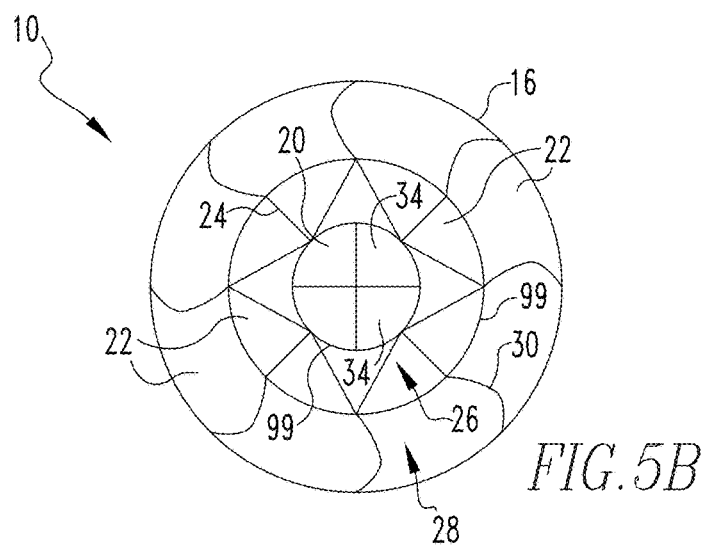
FIG. 5b shows a segmented annular geometry with alternative means of subdivision.
Figure 5C:
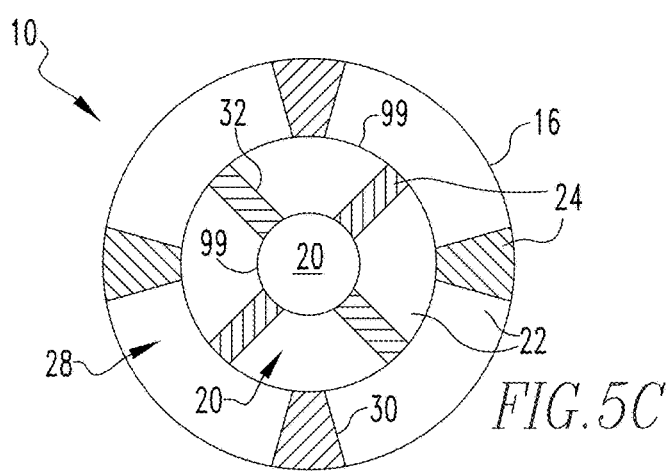
FIG. 5c is an illustration of example alternative forms of subdividing ligament geometry.
Figure 6A:
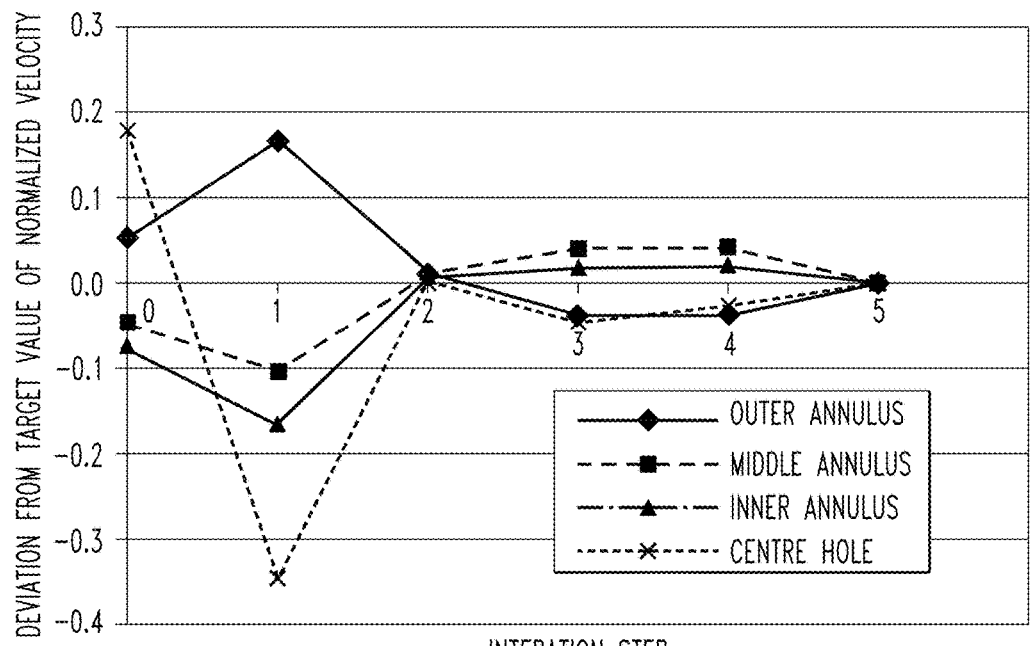
FIG. 6a is a graph showing convergence of the design towards the desired velocity profile.
Figure 6B:
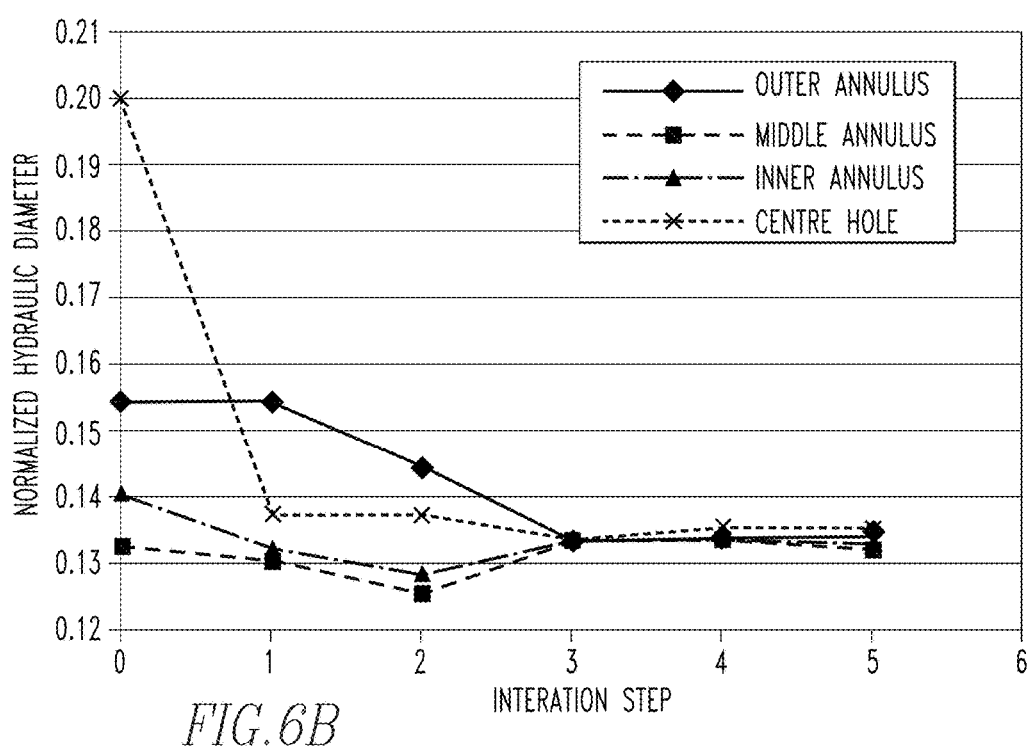
FIG. 6b is a graph showing convergence of the design in terms of the hydraulic diameter of the passages.

Referring now to the drawings wherein like reference numerals refer to similar or identical parts throughout the several views, and more specifically to FIGS. 4a and 4b thereof, there is shown a flow conditioner 10 for a circular pipe 12 having an axis 14. The flow conditioner 10 comprises a plate 16 having a face 18 to be disposed in the circular pipe 12 with the face 18 of the plate 16 perpendicular to the axis 14 of the pipe 12. The plate 16 has a central circular passage area 20 through which fluid flows surrounded by two or more concentric arrays of segmented annular passages 22 for fluid flow defined by separating and subdividing ligaments 24, with at least one array 26 of annular passages 22 having a radial width different than a radial width of a second array 28 of annular passages 22.

With reference to FIGS. 5a-5c, 7, 9a and 9b, the plate 16 may have at least one subdividing ligament 30 having a width different than a width of a second subdividing ligament 32. The central circular channel may be subdivided into 2 or more separate passages 34. The subdivision into segmented annular passages 22 may be achieved by means of ligaments 24 aligned along a radius of the circular geometry of the conditioner. The subdivision into segmented annular passages 22 may be achieved with ligaments 24 that are aligned at an angle relative to a radius of the circular geometry of the conditioner. The sides of each subdividing ligament may be straight and parallel.

The sides of each subdividing ligament may be curved. The sides of each subdividing ligament may be non-parallel. The internal corners 40 of the segmented annular passages 22 may be rounded. The upstream edges 36 of the passages may be chamfered or rounded. The downstream edges 38 of the passages may be chamfered or rounded. All passages may have a substantially equal hydraulic diameter. The ratio of the length of the passages to their hydraulic diameter may be greater than 1.

The ligaments 24 that subdivide the annular passages 22 may get progressively thicker at distances that are further from the center of the pipe 12, in order to obtain an approximation of a fully-developed flow profile.

The present invention pertains to a flow conditioner 10 for a circular pipe 12 having an axis 14. The flow conditioner 10 comprises a plate 16 having a face 18 to be disposed in the circular pipe 12 with the face 18 of the plate 16 perpendicular to the axis 14 of the pipe 12. The plate 16 has a central circular passage area 20 through which fluid flows surrounded by two or more concentric arrays of segmented annular passages 22 for fluid flow defined by separating and subdividing ligaments 24, with at least one subdividing ligament 30 having a width different than a width of a second subdividing ligament 32.

The present invention pertains to a flow conditioner 10 for a circular pipe 12 having an axis 14. The flow conditioner 10 comprises a plate 16 having a face 18 to be disposed in the circular pipe 12 with the face 18 of the plate 16 perpendicular to the axis 14 of the pipe 12. The plate 16 has a central circular passage area 20 through which fluid flows surrounded by two or more concentric arrays of segmented annular passages 22 for fluid flow defined by separating and subdividing ligaments 24, with at least one array 26 of annular passages 22 having a radial width different than a radial width of a second array 28 of annular passages 22 and at least one subdividing ligament 30 having a width different than a width of a second subdividing ligament 32.

The present invention pertains to a method of producing an optimized geometry of flow conditioner 10 for a circular pipe 12 having an axis 14. The method comprises the steps of storing a desired value for a pressure loss coefficient of the conditioner in non-transitory memory. There is the step of storing a shape of velocity profile desired in the memory. There is the step of setting manufacturing goals. There is the step of storing a number of annular rings to be used in the conditioner to subdivide the pipe 12 cross-section in the memory. There is the step of storing a number of subdivisions for each annular ring and for a central circular passage area 20 of the conditioner in the memory. There is the step of setting a width of each annular ring to an initial value in the memory. There is the step of setting a width of circular ligaments 24 of the conditioner to an initial value in the memory. There is the step of setting a width of subdividing ligaments 24 of the conditioner to an initial value in the memory. There is the step of calculating a hydraulic diameter of each of the passages of the conditioner with a computer from information stored in the memory in steps a-g, the computer in communication with the memory. There is the step of setting a thickness of the conditioner plate 16 to a value based on a desired ratio of passage length to hydraulic diameter in the memory. There is the step of determining resistance and flow characteristics of the conditioner geometry with the computer based on steps a-g. There is the step of adjusting the geometry iteratively with the computer until the specified goals are achieved.

There may be the step of setting a pressure loss coefficient of less than 2 in the memory. There may be the step of the step of entering into the memory a target flow profile based on fully developed flow conditions. There may be the step of entering into the memory a flat velocity profile. There may be the step of entering into the memory a parabolic profile. There may be the step of entering into the memory a velocity profile representing fully developed turbulent flow. There may be the step of including the step of setting a constraint that all passages have a minimum dimension greater than 0.1 D in the memory.

There may be the step of setting a constraint that all ligaments 24 have a width of greater than 0.01 D in the memory. There may be the step of setting a constraint that all corners have a minimum radius of 0.01 D in the memory. There may be the step of setting a constraint that all passages have an essentially equal hydraulic diameter in the memory. There may be the step of setting a constraint that the minimum ratio of the length of the passages to their hydraulic diameter is greater than 1 in the memory.

There may be the step of setting the number of annular rings to between 2 and 12 in the memory. There may be the step of limiting the total number of passages to 0.5 times the square of the number of rings in the memory. The adjusting step may include the step of adjusting the radial width of the segmented annular passages 22. The adjusting step may include the step of adjusting the radial width of the subdividing ligaments 24. The adjusting step may include the step of adjusting the width of the circular ligaments 24. The adjusting step may include the step of adjusting the number of subdivisions in each annular area. The adjusting step may include the step of adjusting the number of annular rings.

Figure 15:
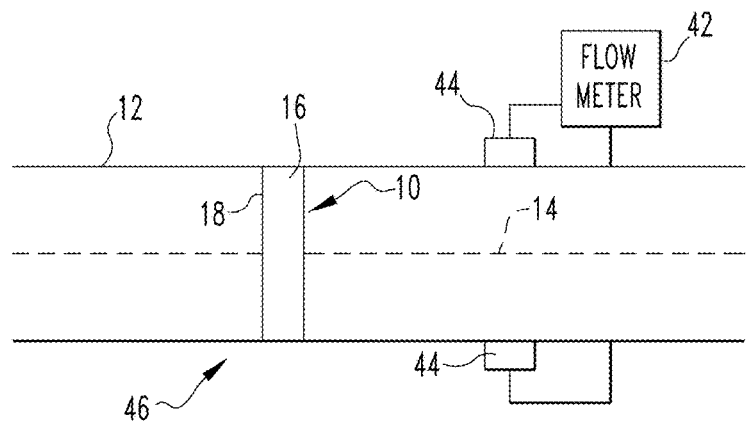
FIG. 15 shows a representation of the system of the present invention.

FIG. 15 shows a system 46 for measuring fluid flow in a pipe. The system comprises a conditioner 10 disposed in the pipe. The system comprises ultrasonic transducers 44 in communication with the fluid in the pipe. The system 46 comprises an ultrasonic flow meter 42 in communication with the pipe which determines the fluid flow from ultrasonic signals transmitted and received by the transducers. An example of a flow meter with ultrasonic transducers for fluid flow measurement that may be used is available for purchase from Cameron International Corporation, having model name Caldon LEFM 240Ci. Such a flowmeter 42 is designed to generate and receive electronic signals from the transducers and to process the signals in order to compute information related to the fluid flow rate through the pipe.

In the operation of the invention, the conditioner described here is based on dividing the cross-sectional area of a circular pipe 12 into annular areas centered on the pipe 12 centerline, as illustrated in FIGS. 4a and 4b. Circular ligaments 99 separate these annular areas from one another and subdividing ligaments 24 partition each area into two or more segmented annular passages 22 through which the fluid can flow. The number and width or circular ligaments 24 combined with the number and width of subdividing ligaments 24 determines the overall porosity of the conditioner. Furthermore, by varying the number of subdividing ligaments 24, or the thickness of these ligaments 24 from one area relative to another, the hydraulic diameter, d, and porosity can be varied, and hence the flow resistance can be graded to produce the desired flow characteristics.

The outer segmented-annular ring of passages can have an outer bounding wall included in the design of the conditioning element, or can be open at the outer circumference such that the inside wall of the pipe 12 forms in the outer wall of each of those passages.

A benefit of use of a segmented annular geometry over circular passages is easily explained by reducing one of the problems of circular holes down to a simple example. Consider a conditioner with 19 circular passages of equal size arranged in a hexagonal pattern. The maximum size that these passages can be before they merge together is one fifth of the inner diameter of the pipe 12. Therefore the maximum free area would be approximately 76% of the pipe 12 area. With segmented annular passages 22 the free area in any portion of the conditioner can be larger than this limit, whilst still having sufficient ligament width for mechanical strength of the conditioner.

In the preferred embodiment of this invention, the length, l, of each segmented annular passage is equal to the others and to the thickness of the plate 16, though variations with different passage lengths can also be conceived by changing the plate 16 thickness associated with each ring. It is however, important to consider the overall length of the passages and their hydraulic characteristics. Passages that are too short in length will be ineffective at preventing the passage of swirl, whereas passages that are too long may increase the pressure loss or unnecessarily increase the size of the conditioner, with consequences for manufacturing. Furthermore if the ratio of the length of the passage to its hydraulic diameter differs from one set of holes to another, then the characteristics of the flow through the holes may differ significantly as a function of the pipe 12 Reynolds number.

For passages that have a very short length to hydraulic diameter ratio (l/d), swirl will pass easily, and after the flow separates at the entrance to the passage, it will not reattach inside the passage (this can be termed fully separated flow). For passages of intermediate l/d, swirl may still pass, and the flow may or may not reattach inside the passage depending on the flow conditions prevailing (this can be termed marginally separated/attached flow). For passages of relatively long l/d, swirl will be suppressed and the separated flow at the entrance to the passage will re-attach (this can be termed fully reattached flow). In terms of the pressure loss for flow through a passage between two sections of pipe 12 it can be shown that the pressure loss is greatest for fully separated flow, and reduces to a minimum once the flow is fully reattached. Beyond the minimum pressure loss point the pressure loss will increase again owing to increased frictional losses in the passages of the conditioner. Therefore it is possible to optimize a flow conditioner 10 in terms of the length to hydraulic diameter ratio.

For the common thick-plate 16 conditioners available today that use circular passages, the thickness of the plate 16 is constant and normally in the range of 0.12 to 0.15 relative to the pipe 12 diameter. The hole diameters are typically in the range of 0.1 to 0.19 relative to the pipe 12 diameter, with resulting l/d values in the range of 0.63 to 1.5. The range of l/d corresponding to marginally separated/attached flow is typically between 0.5 and 1. In the likes of the Laws, Gallagher and Spearman plates, different values of passage diameter are used in each conditioner, with the result that under certain flow conditions some passages may have separated flow whereas others may have reattached flow.

It is desirable to avoid the possibility of having both separated and reattached flow conditions occurring in different passages of the same conditioner at the same time. One solution to this would be to increase plate 16 thickness until fully reattached conditions occur in largest of the passages. However, when this is done the pressure loss coefficient would then increase undesirably in the passages of smaller hydraulic diameter. It is therefore attractive to be able to produce a conditioner design where the value of hydraulic diameter of all passages is the same. When the hydraulic diameters of each passage are the same, then with a conditioner of constant thickness the values of l/d will also be the same, and consequently the frictional component of pressure loss through the hole will also be the same. For circular passages, the hydraulic diameter is simply equal to the diameter, and therefore for l/d to be constant the passages should all have the same diameter, which imposes unwanted restrictions on the geometric arrangement of the holes in terms of producing the desired graded resistance. For segmented annular passages 22, the hydraulic diameter is equal to four times the cross-sectional area divided by the perimeter. Therefore the hydraulic diameter is a function not only of the cross-sectional area of the passage, but also the aspect ratio of the passage. This provides greater flexibility in design when it is desirable to vary or optimize the conditioner design in terms of both porosity and hydraulic diameter.

The conditioner of the current invention can be manufactured from a variety of materials by a method chosen to suit the materials of construction. For conditioners that are to be used in small pipes is most likely that the conditioner would be manufactured from a solid part made of metal or plastic with the passages cut into the material using machine tools. Techniques such as water-jet cutting may be appropriate for some materials up to a certain thickness or conventional drilling and milling techniques can be employed. For larger pipes, it is conceivable that the conditioner would be assembled by means such as using pipe sections of different diameters for the circular ligaments 99, and joining these to one another using subdividing ligaments 24 cut from sheet metal of a given thickness. This possibility highlights an advantage of the current invention, in that the number, thickness and diameter of the circular ligaments 99 could be selected from standard sizes of pipe. With the dimensions of the circular ligaments 99 fixed, the number and thickness of the subdividing ligaments 24 can then be selected in order to produce the desired porosity for each ring. In the design process the number of rings and number of subdividing ligaments 24 can be constrained in order to produce an appropriate balance between material and manufacturing cost.

The conditioner can be designed either to fit fully inside a pipe section with some means of securing it in place, or it can be designed to fit between pipe flanges. For increased mechanical strength, the segmented annular passages 22 can be designed with rounded internal corners 40. To reduce pressure loss without reducing the thickness of the circular 99 and subdividing ligaments 24 beyond a certain design value, inlets and/or outlets of the passages can be chamfered to streamline the design and reduce flow separation.

In the center of the conditioner there will normally be a singular circular passage but alternatively this could also be segmented to form two or more separate central passages as illustrated in FIGS. 5a-5c and FIGS. 6a and 6b.

In terms of practical preference, the conditioner would be installed as a single unit. However, two or more units could be installed in series with some separation in between in order to perform more effective flow conditioning. In terms of conditioning performance versus overall pressure loss, this may be preferable to using a single unit.

The design of a particular conditioner geometry according to the current invention begins with defining the required characteristics of the conditioner in terms of overall pressure loss and desired axial flow profile shape. At this stage any other constraints or requirements can be added such as the overall thickness of the plate 16, the minimum length to hydraulic diameter ratio, the minimum width of circular 99 and subdividing 24 ligaments, the minimum radius of the inside corners and/or a specification that all passages have the same hydraulic diameter. Next the general characteristics of the conditioner are considered in terms of the approximate total number and size of the passages. Once the number of annular rings and the number of segments per ring has been determined, values are chosen to produce an initial design and then the optimization of the conditioner can begin (or indeed, it is also conceivable that the optimization process could include varying the number of rings and segments per ring).

The thickness of the circular ligaments 99 between annular rings and the thickness of the subdividing ligaments 24 are set to initial values chosen from a practical perspective. The radial width of the segmented annular passages 22 is set to initial values (for example approximately equal) such that the total radial width of the passages plus the circular ligaments 99 sums to the diameter of the conditioner. The thickness of the plate 16 is set to an initial value.

The porosity, hydraulic diameter are then calculated for each ring. This, in addition to knowledge of the thickness of the conditioner, allows the pressure loss coefficient and relative velocity to be estimated for each segmented annular ring. In practice this can be achieved using semi-empirical pressure loss models that relate these terms, such as those described by "I E Idelchik, Handbook of Hydraulic Resistance, $3^{rd}$ Edition, Jaico Publishing House, 2005", incorporated by reference herein. Alternatively, the profile and pressure loss characteristics can be determined by means of computational fluid dynamics or by experimental testing. The geometry is then iteratively adjusted until the desired velocity profile and other optimal characteristics are achieved.

Some trial and error may be required in terms of the starting conditions and constraints in order to obtain convergence and produce a solution that has the required characteristics.

This process can now be illustrated by means of an example in which it is desired to produce a conditioner with a low pressure loss coefficient of 0.5, and with each passage having the same hydraulic diameter.

Common thick-plate type conditioners have between 25 and 32 circular passages, with the outer holes typically being sized at approximately 10% of the pipe diameter. Therefore for a conditioner design with a broadly similar number and size of passages one can start by dividing the pipe 12 into a central circular passage and three annular rings, the radial width of each ring being less than 14% of the diameter. Then using radial subdividing ligaments 24, and taking into consideration a desire for symmetry, one can partition the inner annulus into six segments, and each of the outer annuli into 12 segments, resulting in 31 passages in total. The thickness of the circular 99 and subdividing ligaments 24 can be set to an arbitrary value to start, say 1% of the pipe 12 diameter. In this example it is started with circular 99 and subdividing 24 ligaments of 0.01 D, and a width of 0.12 D for each of the annular sections, with the result that the starting diameter of the central circular passage is 0.2 D (given the constraint that the outer wall and circular ligaments 99 plus the width of the passages should sum to equal the pipe 12 diameter).

At this point, the hydraulic diameter of the largest passage is 0.2 D. Given that it is desirable to target an l/d value of greater than 1, a plate 16 thickness of 0.2 D is selected at this stage, which should ensure that this requirement is met, and can of course be adjusted as part of the optimization process.

In the case of a single central passage, its porosity is determined by its diameter and by the thickness of the circular ligament that separates it from the first annular ring. Therefore the first step of the optimization is to adjust the other geometric parameters until the pressure loss coefficient of this passage is close to the target value for the conditioner as a whole. In this particular example, this first step is achieved by setting the constraint that the circular ligaments 99 should be of equal thickness (with the exception of the outer wall, which is fixed at 0.01 D), and then increasing the thickness of those, concurrently reducing the diameter of the central passage, until the desired loss coefficient is achieved.

The second step is to adjust the width of the radial ligaments 24 in each ring until the desired velocity profile shape is achieved, whilst also considering the target for the overall loss coefficient. In this step the value for the width of the radial ligaments 24 in each annulus is adjusted iteratively until the desired profile shape and loss coefficient is achieved. The result of this step will be a design which will produce the desired velocity profile, and have the intended overall loss coefficient, but may not yet meet some overall requirements such as every passage having the same hydraulic diameter.

To obtain the same hydraulic diameter for the passages of each ring a further iterative step involves adjusting the radial width of each of the segmented annular channels to satisfy the condition that all hydraulic diameters are the same, keeping all other dimensions constant, with the exception of the diameter of the central passage, which may also change. When the adjustment is made in this way, the relative velocities will diverge again from their target values, requiring further iterations to be made.

In the next iterative step, the widths of the circular ligaments 99 are adjusted again to bring the loss coefficient for the central passage back closer to its target value. In the fifth and final iterative step the desired velocity profile and loss coefficient is sought, again by means of adjusting the width of the radial ligaments 24.

At the end of the five steps described above, the resulting conditioner design has an overall porosity of 71% with a calculated loss coefficient of 0.502, a velocity profile within 0.2% of the target, and hydraulic diameters equal within +/−1.3%. Further steps could be added, but these would be unlikely to result in an improved result once manufacturing considerations and model limitations are taken into account.

Figure 7:
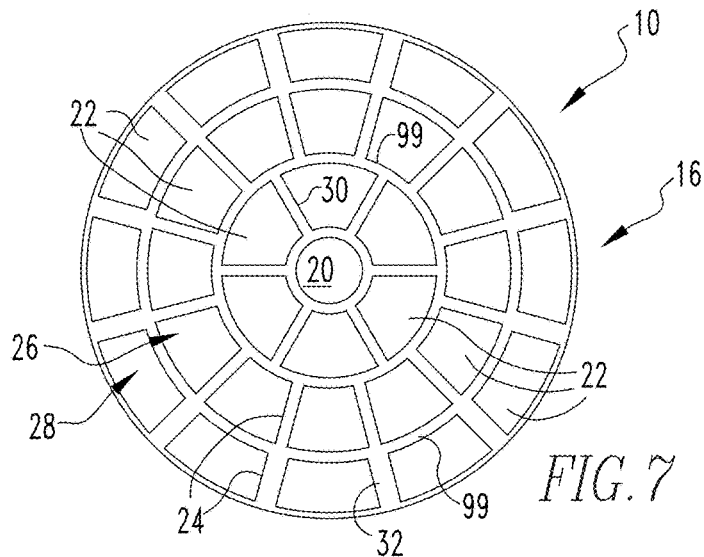
FIG. 7 is an illustration of the design resulting from the optimization example.
Figure 8:
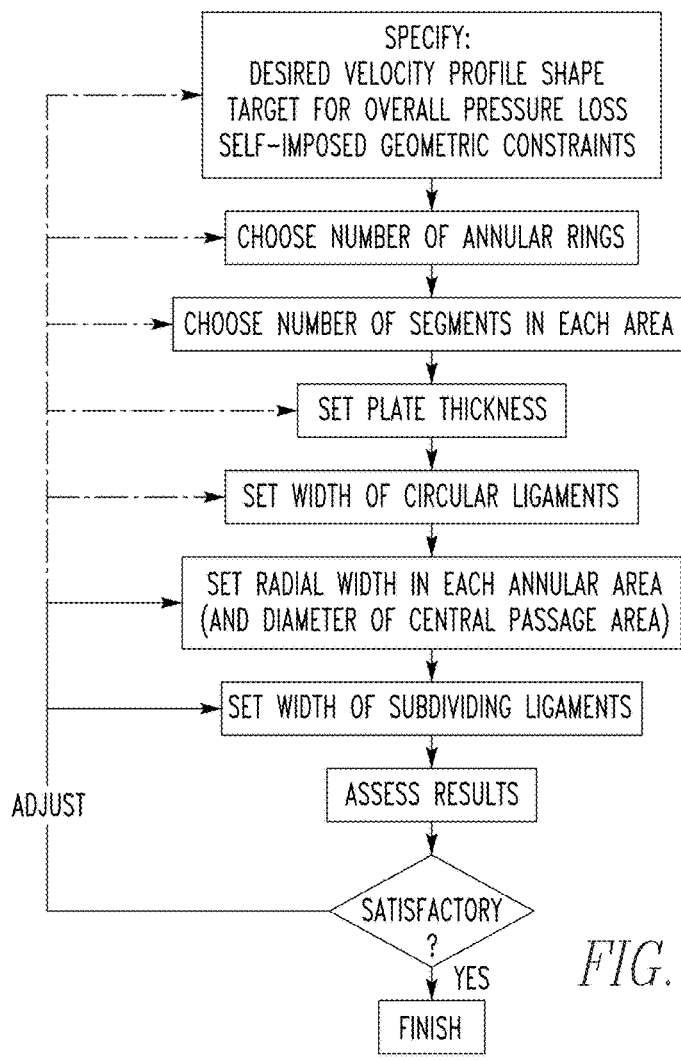
FIG. 8 is a simplified flow chart illustrating the optimization process.

Table 1 shows the geometric parameters of the conditioner that are varied in this particular optimization example. The values shown in bold as those that were adjusted in each step. Table 2 shows the resulting values of hydraulic diameter, pressure loss coefficient and normalized velocity for each step. FIGS. 5a-5c, 6a and 6b illustrate the convergence of the velocity profile and the hydraulic diameters respectively. FIG. 7 shows an illustration of the design resulting from the optimization example given above. FIG. 8 outlines the optimization process in the form of a simple flow chart.

Figures 9A, 9B:
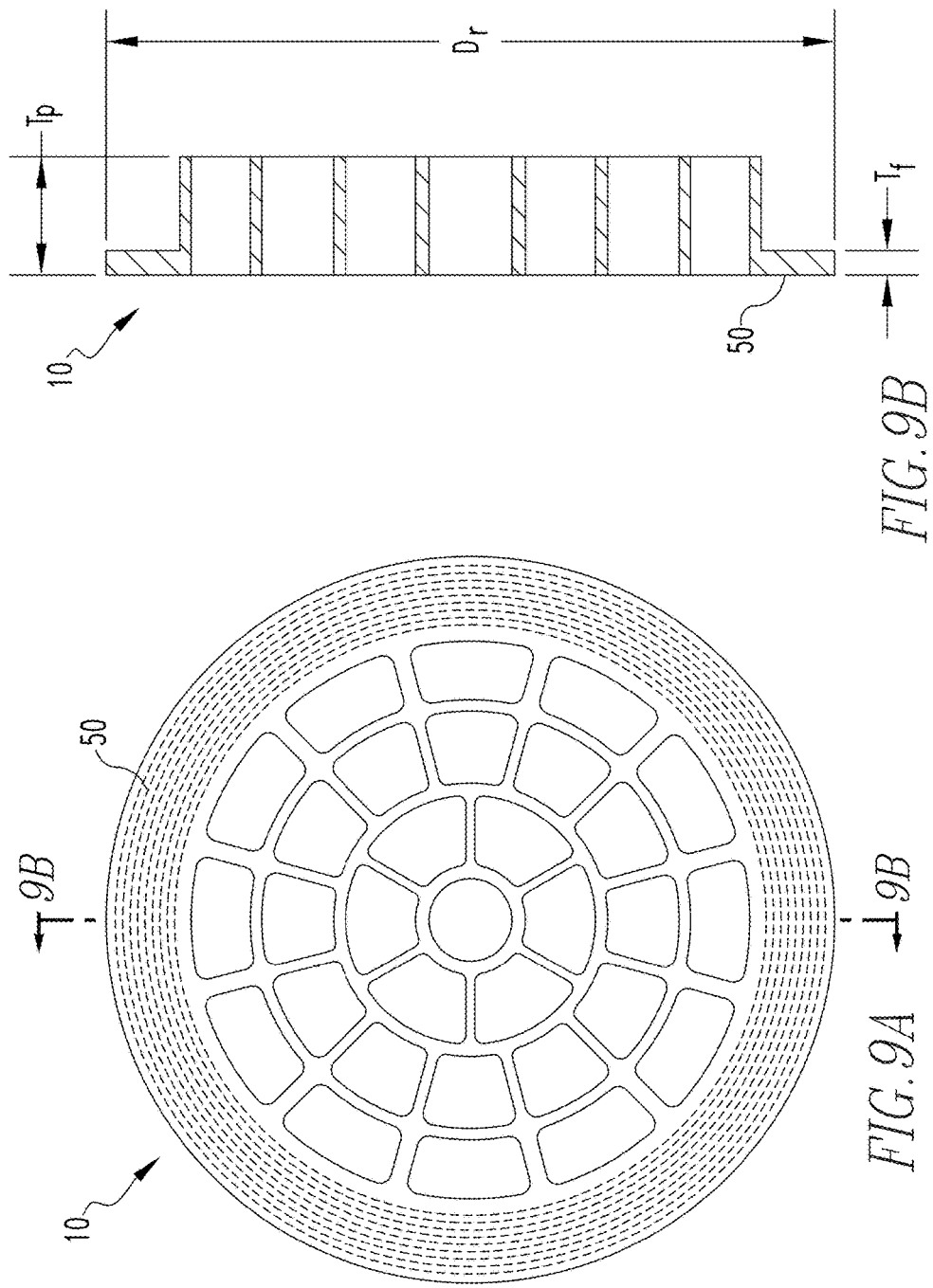
FIGS. 9a, 9b and 9c show a resultant geometry including rounded internal corners and flange.
Figure 9C:
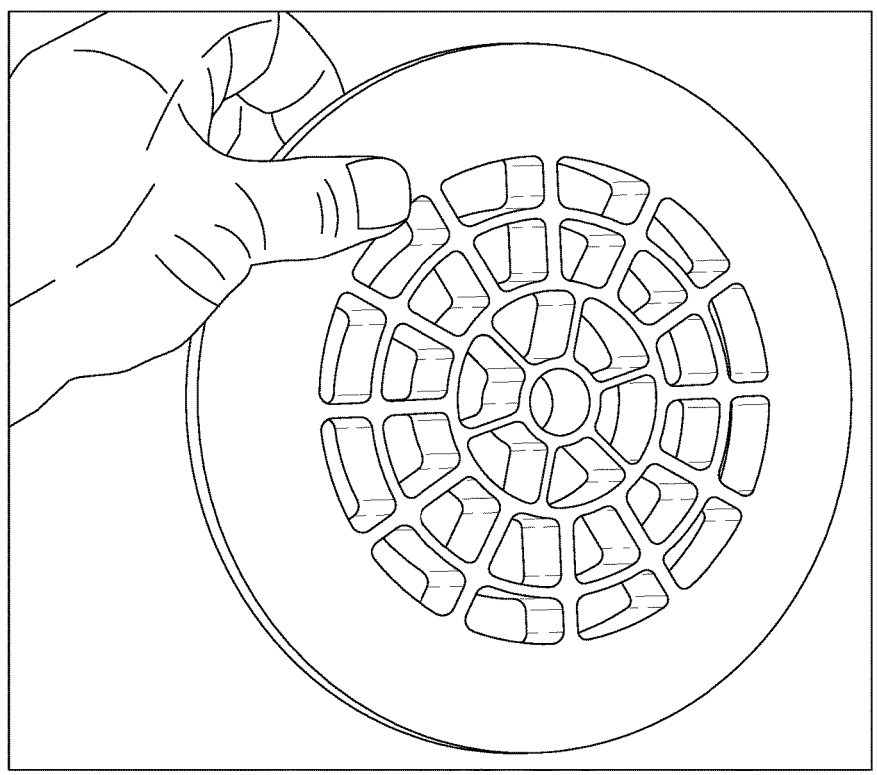

FIGS. 9a-9c show the result of employing a design process similar to that described to determine the geometry of an optimized conditioner 10 design that also accounts for the effects on the passage geometry of including rounded internal corners 40 of a specified radius. FIG. 9a shows a front view and FIG. 9b shows a side view. The resulting conditioner design was then manufactured complete with a flange 50 for installation between pipe 12 sections, as shown in the photograph of FIG. 9c.

Figure 10A:
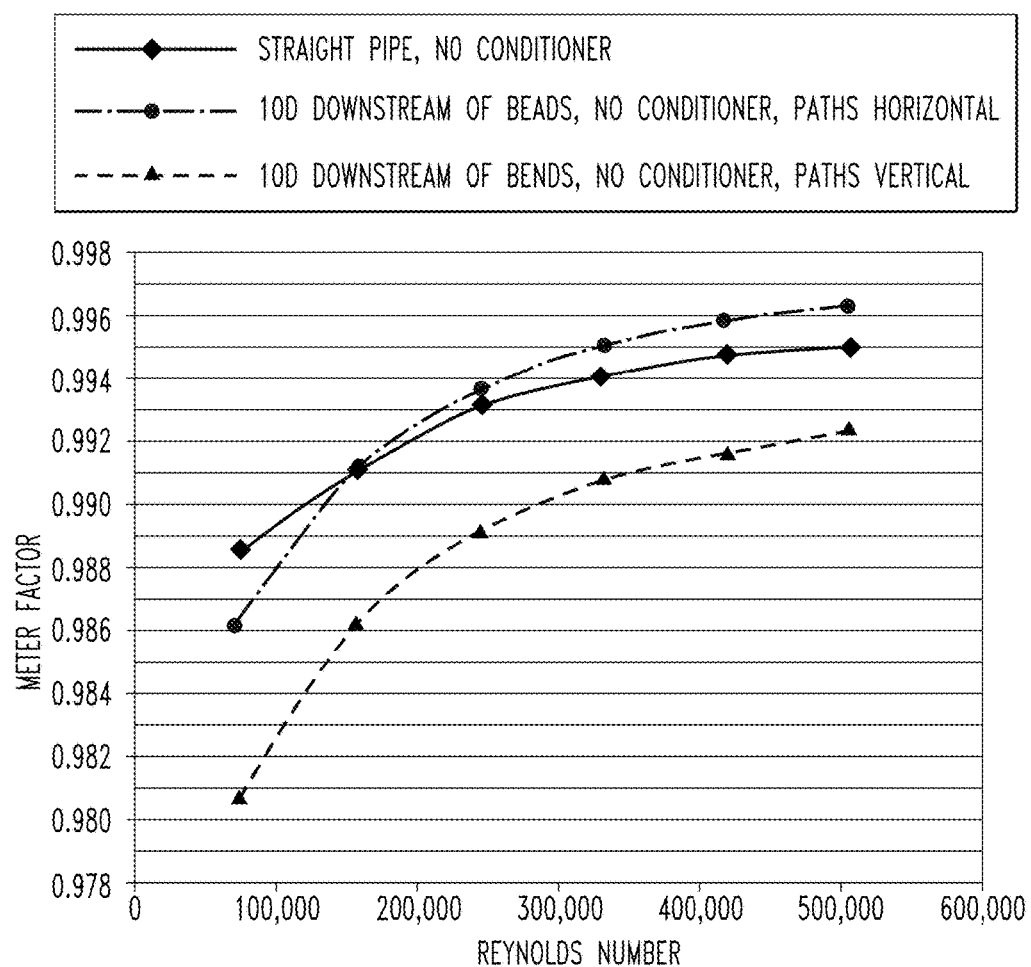
FIG. 10a shows meter factor versus Reynolds number for meter A in straight pipe and downstream of bends with no flow conditioner.
Figure 10B:
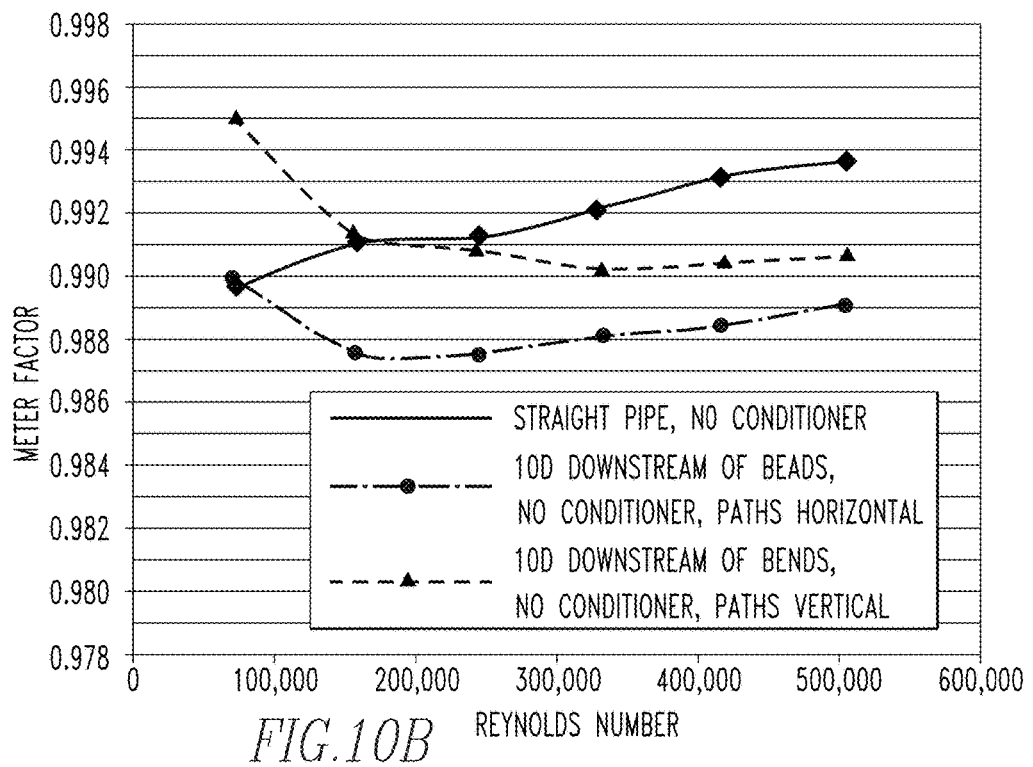
FIG. 10b shows meter factor versus Reynolds number for meter B in straight pipe and downstream of bends with no flow conditioner.

The prototype conditioner was tested downstream of a long straight pipe 12 and then downstream of an arrangement of six out of plane bends known to produce asymmetric distortion of the axial velocity profile and to generate swirl. The tests were conducted using a kerosene substitute fluid with a viscosity of approximately 3 cSt over a range of flowrates in the range of 74 to 740 m3/hr in a 6-inch pipe. A Laws type conditioner (Nova/CPA 50E variant) was also tested in the same configuration. The arrangement of bends was kept the same for all tests. A meter body with eight ultrasonic flow velocity measuring paths was used to determine the effectiveness of the flow conditioner 10. The data from the eight measurement paths was used in two 4-path combinations to determine the influence on the hydraulic correction factor of two 4-path ultrasonic flow meters, and all eight paths were combined to give a measure of the average swirl in the form of a ratio of the tangential velocity to the mean axial velocity. The meter factor data for the 4-path meters was obtained by calibration in an ISO 17025 accredited flow laboratory using a unidirectional ball prover as the traceable reference standard. Test data is presented for the following installation combinations:

- Long straight pipe with no flow conditioning
- Long straight pipe with a Laws type conditioner 10 pipe diameters upstream of the flow meters
- Long straight pipe with the new conditioner 10 pipe diameters upstream of the flow meters
- Flow meters at 10 pipe diameters downstream of six bends with no flow conditioning, measurement paths horizontal
- Flow meters at 10 pipe diameters downstream of six bends with no flow conditioning, measurement paths vertical
- Laws type conditioner 4 pipe diameters downstream of six bends, with the flow meters 10 pipe diameters downstream of the conditioner
- New conditioner 4 pipe diameters downstream of six bends, with the flow meters 10 pipe diameters downstream of the conditioner FIGS. 10a and 10b shows the results for meters A and B in the straight pipe configuration and at 10 diameters downstream of the bends without flow conditioning, with the measurement paths in both horizontal and vertical orientations. It can be observed that under these conditions, with no flow conditioning, the swirl and distortion generated by the bends results in changes in meter factor that are typically in the range of 0.3 to 0.5%.

Figure 11A:
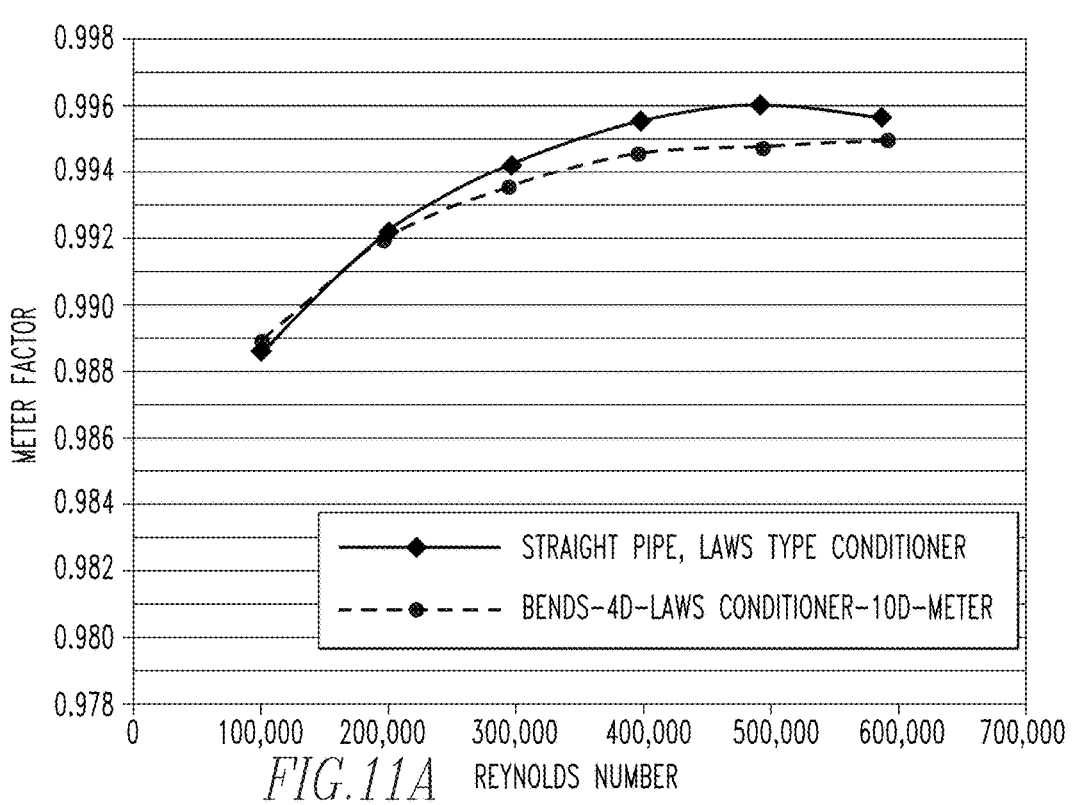
FIG. 11a shows meter factor versus Reynolds number for meter A in straight pipe and downstream of bends with the 4D-Laws conditioner-10D-Meter arrangement.
Figure 11B:
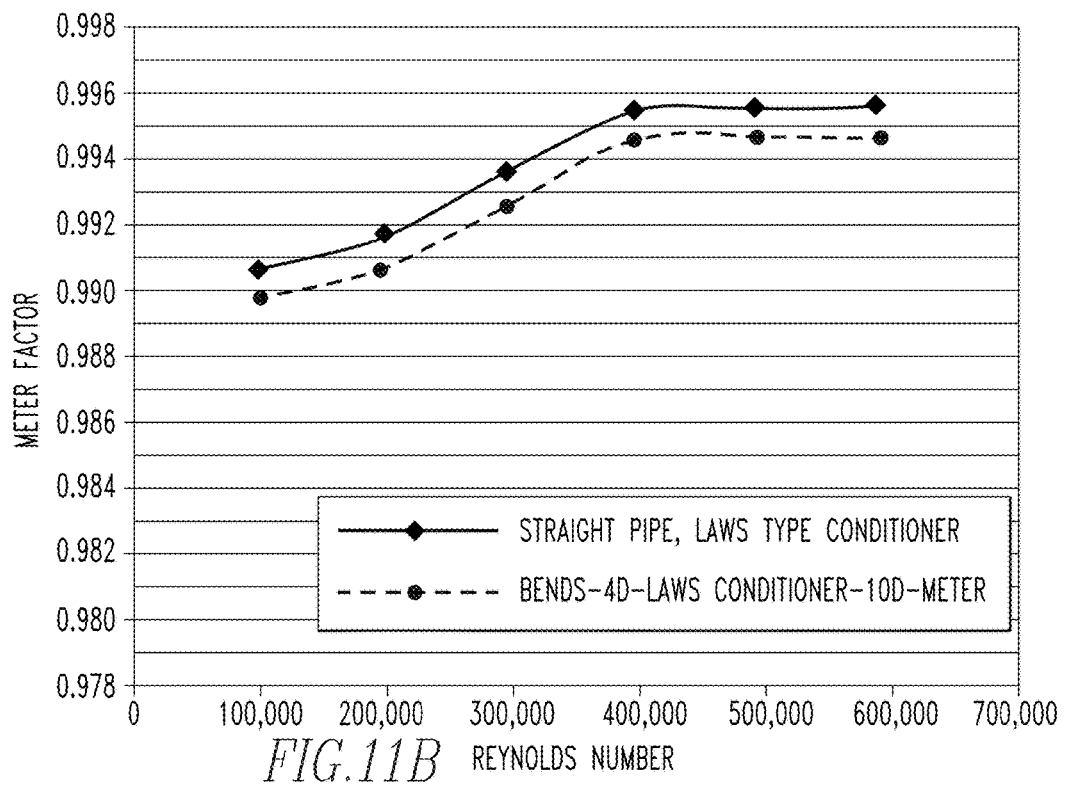
FIG. 11b shows meter factor versus Reynolds number for meter B in straight pipe and downstream of bends with the 4D-Laws conditioner-10D-Meter arrangement.

FIGS. 11a and 11b show the results for meters A and B installed 10 diameters downstream of a Laws type thick-plate conditioner. The difference between the straight pipe case and the case where the conditioning plate is 4 diameters downstream of the bends is typically on the order of 0.1% or less.

These can be summarized quantitatively in terms of a flow weighted mean error shift. The results of this calculation are given in Table 3.

Figure 12A:
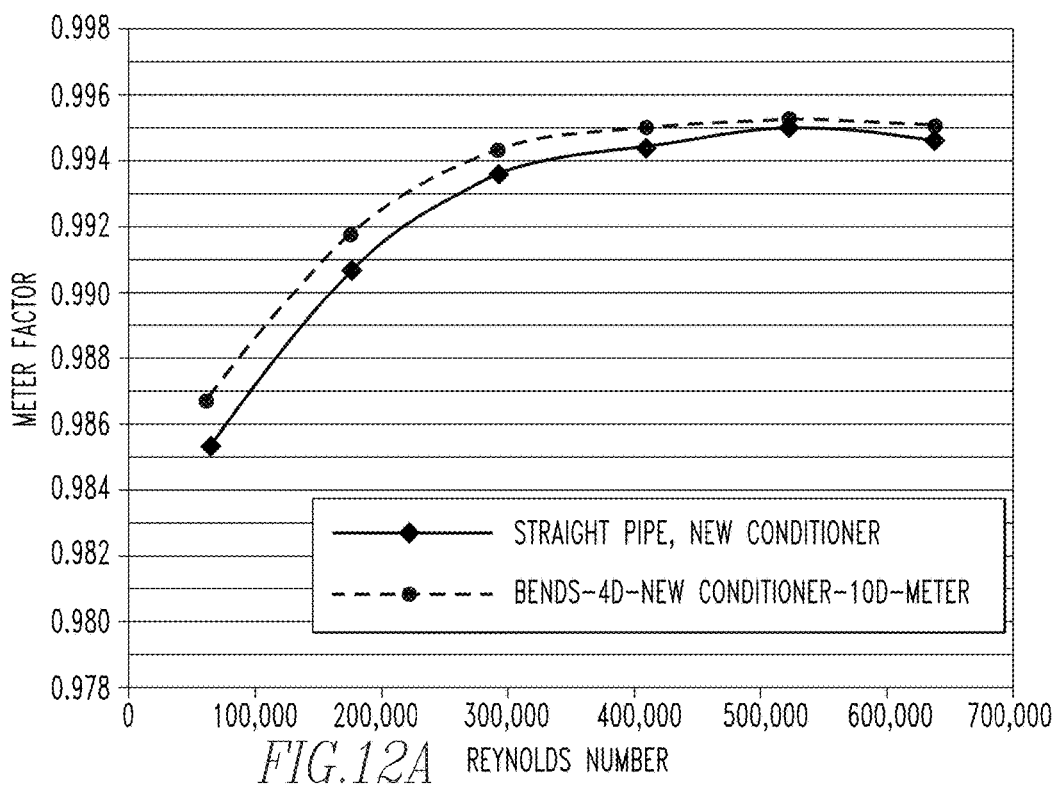
FIG. 12a shows meter factor versus Reynolds number for meter A in straight pipe and downstream of bends with the 4D-Prototype conditioner-10D-Meter arrangement.
Figure 12B:
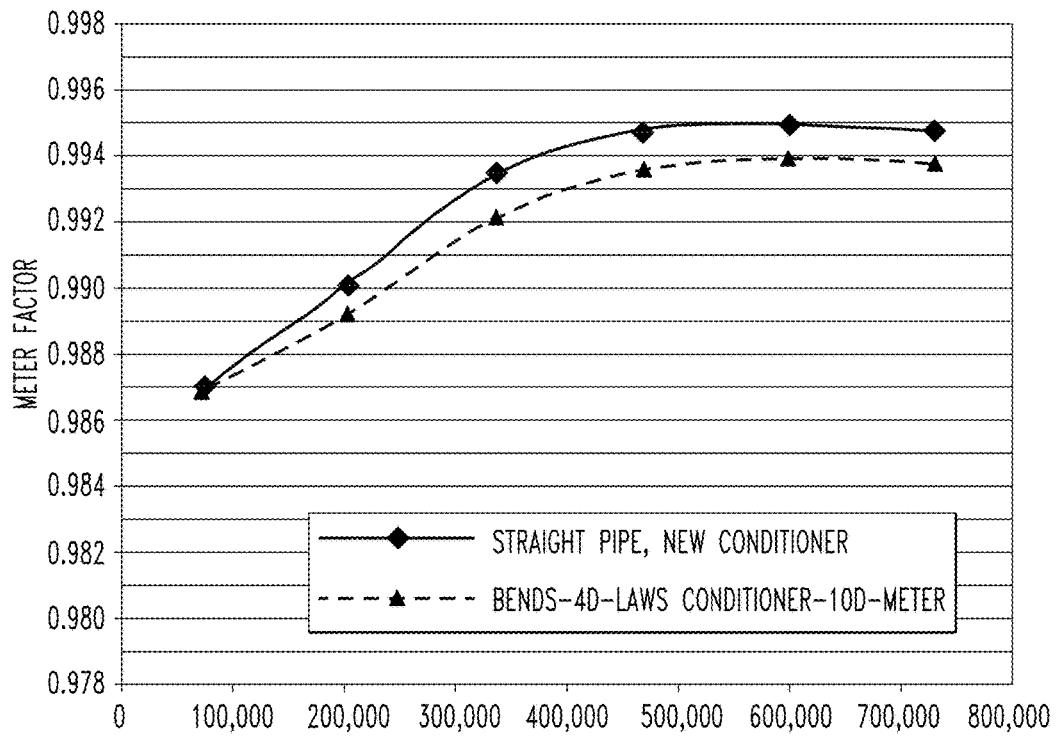
FIG. 12b shows meter factor versus Reynolds number for meter B in straight pipe and downstream of bends with the 4D-Prototype conditioner-10D-Meter arrangement.

FIGS. 12a and 12b show the results obtained using the new prototype conditioner previously described. It can be readily observed that the difference between the straight pipe 12 case and the case where the conditioning plate 16 is 4 diameters downstream of the bends is similar to the case for the Laws type conditioner, typically on the order of 0.1% or less. These results can also summarized quantitatively in terms of a flow weighted mean error shift, as reported in Table 3.

The data recorded in Table 3 shows that in terms of the flow measurement performance of a 4-path ultrasonic meter, the new prototype conditioner matches the performance of the Laws type thick plate 16 conditioner as the flow weighted mean error shifts are of a similar magnitude, all being less than 0.1%.

Figure 13:
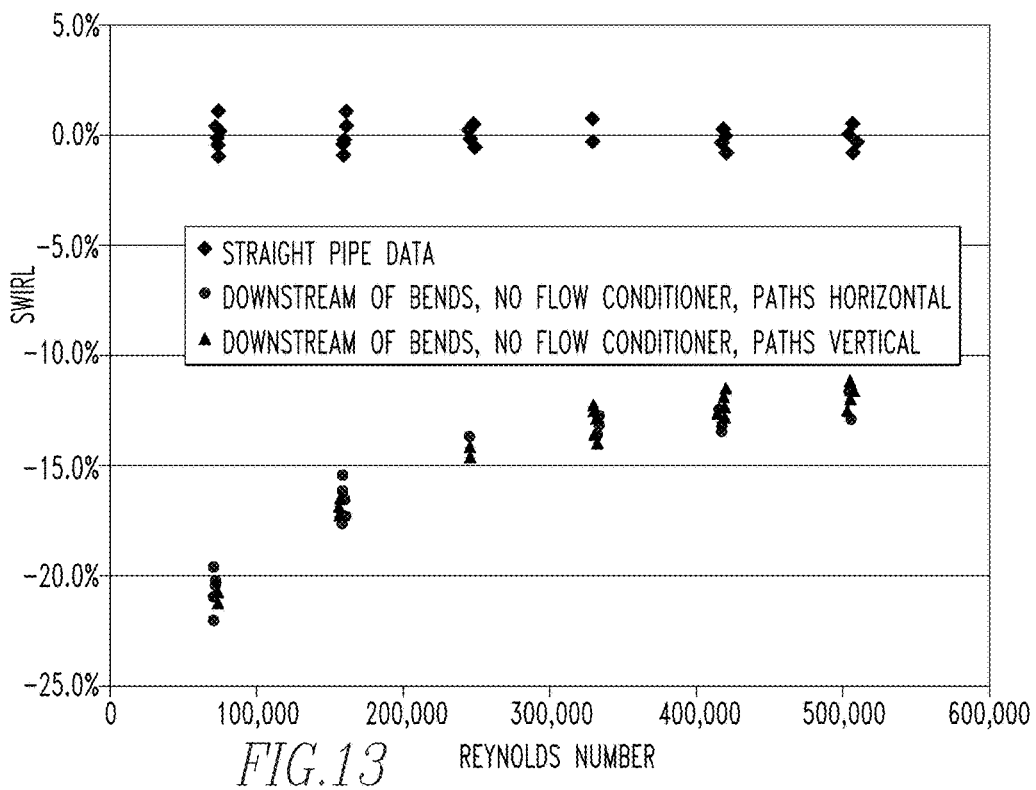
FIG. 13 shows swirl measured using the 8-path ultrasonic meter in straight pipe and 10D downstream of bends with no flow conditioning.
Figure 14:
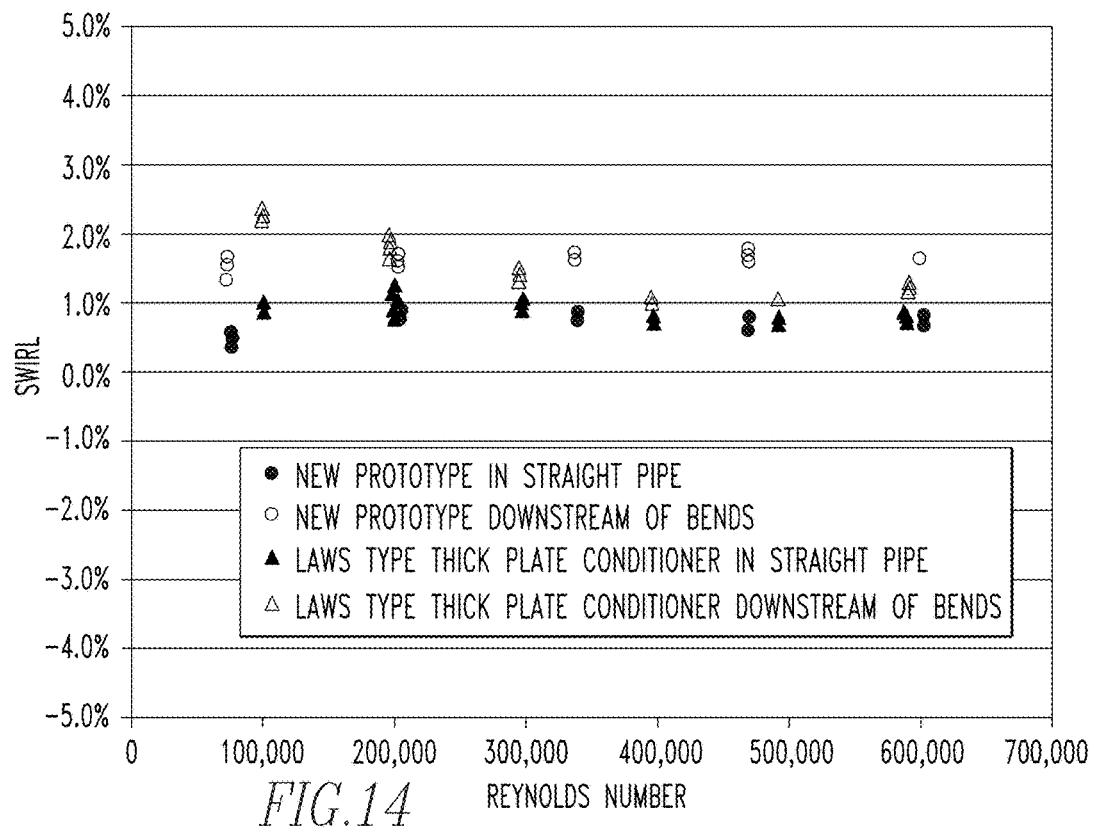
FIG. 14 shows swirl measured using the 8-path ultrasonic meter in straight pipe and downstream of bends with the 4D-conditioner-10D-Meter arrangement, for both the Laws type conditioner and the new prototype.

FIGS. 13 and 14 show the swirl quantified in terms of the tangential velocity as a percentage of the mean axial velocity. In FIG. 13, the bare straight pipe 12 case plus the swirl generated by the bends and measured ten diameters downstream with no flow conditioning is shown. It is clear that the bends generate a high level of swirl. FIG. 14 shows the results for the two flow conditioners tested here, the Laws type conditioner and the new prototype. Comparing FIGS. 13 and 14 it is clear that both conditioners substantially reduce swirl. At the higher Reynolds numbers it appears that the Laws type conditioner is slightly more effective at reducing swirl than the new prototype. However, when the measurement results of Table 3 are taken into consideration, this appears to be an insignificant difference.

During these tests, the pressure loss across the prototype conditioner was measured. The measurements of pressure loss can be converted into a dimensionless loss coefficient, which is a useful relative measure of the energy lost when flowing through the conditioner. The pressure loss data is shown in Table 4. For the new prototype, the average loss coefficient is 0.91. This is less than half of the pressure loss corresponding to the Nova/CPA 50E variant of the Laws conditioner, which has a loss coefficient of approximately 2.

In conclusion, the results of the tests show that for use with a 4-path ultrasonic meter, the measurement results with the prototype conditioner are equivalent to the Laws type plate 16, but are achieved with less than half the pressure loss.

TABLE 1

| | Width (normalised to pipe diameter) | | | | | | | | | |
|---|---|---|---|---|---|---|---|---|---|---|
| Iteration step | Outer annulus | Radial ligament | Circular ligament | Middle annulus | Radial ligament | Circular ligament | Inner annulus | Radial ligament | Circular ligament | Centre hole |
| 0 | 0.1200 | 0.0100 | 0.0100 | 0.1200 | 0.0100 | 0.0100 | 0.1200 | 0.0100 | 0.0100 | 0.2000 |
| 1 | 0.1200 | 0.0100 | 0.0205 | 0.1200 | 0.0100 | 0.0205 | 0.1200 | 0.0100 | 0.0205 | 0.1370 |
| 2 | 0.1200 | 0.0443 | 0.0205 | 0.1200 | 0.0211 | 0.0205 | 0.1200 | 0.0188 | 0.0205 | 0.1370 |
| 3 | 0.1040 | 0.0443 | 0.0205 | 0.1302 | 0.0211 | 0.0205 | 0.1278 | 0.0188 | 0.0205 | 0.1331 |

TABLE 1-continued

Width (normalised to pipe diameter)

| Iteration step | Outer annulus | Radial ligament | Circular ligament | Middle annulus | Radial ligament | Circular ligament | Inner annulus | Radial ligament | Circular ligament | Centre hole |
|---|---|---|---|---|---|---|---|---|---|---|
| 4 | 0.1040 | 0.0443 | 0.0202 | 0.1302 | 0.0211 | 0.0202 | 0.1278 | 0.0188 | 0.0202 | 0.1350 |
| 5 | 0.1040 | 0.0425 | 0.0202 | 0.1302 | 0.0240 | 0.0202 | 0.1278 | 0.0208 | 0.0202 | 0.1349 |

TABLE 2

| | Normalised hydraulic diameter | | | | Loss coefficient | | | | Normalised velocity | | | |
|---|---|---|---|---|---|---|---|---|---|---|---|---|
| Iteration step | Outer annulus | Middle annulus | Inner annulus | Centre hole | Outer annulus | Middle annulus | Inner annulus | Centre hole | Outer annulus | Middle annulus | Inner annulus | Centre hole |
| 0 | 0.1541 | 0.1322 | 0.1400 | 0.2000 | 0.175 | 0.149 | 0.138 | 0.086 | 0.936 | 1.015 | 1.057 | 1.339 |
| 1 | 0.1541 | 0.1299 | 0.1317 | 0.1370 | 0.223 | 0.269 | 0.265 | 0.371 | 1.050 | 0.958 | 0.965 | 0.815 |
| 2 | 0.1442 | 0.1250 | 0.1279 | 0.1370 | 0.620 | 0.437 | 0.389 | 0.371 | 0.898 | 1.070 | 1.134 | 1.161 |
| 3 | 0.1331 | 0.1331 | 0.1331 | 0.1331 | 0.672 | 0.396 | 0.365 | 0.388 | 0.847 | 1.103 | 1.149 | 1.114 |
| 4 | 0.1331 | 0.1332 | 0.1334 | 0.1350 | 0.669 | 0.391 | 0.359 | 0.371 | 0.844 | 1.104 | 1.152 | 1.134 |
| 5 | 0.1335 | 0.1317 | 0.1325 | 0.1349 | 0.640 | 0.443 | 0.390 | 0.372 | 0.884 | 1.063 | 1.133 | 1.160 |

TABLE 3

Flow weighted mean error shift

| | Laws type thick-plate | New prototype |
|---|---|---|
| Meter A | 0.08% | −0.06% |
| Meter B | 0.09% | 0.10% |

TABLE 4

| Flowrate m3/hr | Density kg/m3 | Differential pressure PSI | Velocity m/s | Differential pressure Pascals | Loss coefficient, K |
|---|---|---|---|---|---|
| 740 | 800 | 6.9 | 11.3 | 47574 | 0.937 |
| 607 | 800 | 4.5 | 9.2 | 31026 | 0.908 |
| 474 | 800 | 2.5 | 7.2 | 17237 | 0.827 |
| 340 | 800 | 1.5 | 5.2 | 10342 | 0.965 |
| | | | | Average | 0.91 |

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A flow conditioner for a circular pipe having an axis comprising: a plate having a face to be disposed in the circular pipe with the face of the plate perpendicular to the axis of the pipe, said plate having a central circular passage area through which fluid flows surrounded by two or more concentric arrays of segmented annular passages for fluid flow defined by separating and subdividing ligaments, with at least one array of annular passages having a same radial width different than a same radial width of a second array of annular passages, the subdividing ligaments get progressively thicker at distances further from the pipe's axis.

2. The flow conditioner of claim 1 wherein the plate has at least one subdividing ligament having a width different than a width of a second subdividing ligament.

3. The conditioner of claim 1 whereby the central circular channel is subdivided into 2 or more separate passages.

4. The conditioner of claim 1 whereby the subdivision into segmented annular passages is achieved by means of ligaments aligned along a radius of the circular geometry of the conditioner.

5. The conditioner of claim 1 whereby the subdivision into segmented annular passages is achieved with ligaments that are aligned at an angle relative to a radius of the circular geometry of the conditioner.

6. The conditioner of claim 1 whereby the sides of each subdividing ligament are straight and parallel.

7. The conditioner of claim 1 whereby the sides of each subdividing ligament are curved.

8. The conditioner of claim 1 whereby the sides of each subdividing ligament are non-parallel.

9. The conditioner of claim 1 whereby the segmented annular passages have internal corners and the internal corners of the segmented annular passages are rounded.

10. The conditioner of claim 1 whereby the upstream edges of the passages are chamfered or rounded.

11. The conditioner of claim 1 whereby the downstream edges of the passages are chamfered or rounded.

12. The conditioner of claim 1 whereby all passages have a substantially equal hydraulic diameter.

13. The conditioner of claim 1 whereby the ratio of the length of the passages to their hydraulic diameter is greater than 1.

14. The conditioner of claim 1 whereby the ligaments that subdivide the annular passages get progressively thicker at distances that are further from the center of the pipe, in order to obtain an approximation of a fully-developed flow profile.

15. A flow conditioner for a circular pipe having an axis comprising: a plate having a face to be disposed in the circular pipe with the face of the plate perpendicular to the axis of the pipe, said plate having a central circular passage area through which fluid flows surrounded by two or more concentric arrays of segmented annular passages for fluid flow defined by separating and subdividing ligaments, with at least one subdividing ligament having a width different than a width of a second subdividing ligament, the sides of each subdividing ligament are straight and parallel.

16. A flow conditioner for a circular pipe having an axis comprising: a plate having a face to be disposed in the circular pipe with the face of the plate perpendicular to the axis of the pipe, said plate having a central circular passage area through which fluid flows surrounded by two or more concentric arrays of segmented annular passages for fluid flow defined by separating and subdividing ligaments, with at least one array of annular passages having a radial width different than a radial width of a second array of annular passages and at least one subdividing ligament having a width different than a width of a second subdividing ligament, the sides of each subdividing ligament are straight and parallel.

17. A method of producing an optimized geometry of flow conditioner for a circular pipe having an axis comprising the steps of:
  a. storing a desired value for a pressure loss coefficient of the conditioner in non-transitory memory;
  b. storing a shape of velocity profile desired in the memory;
  c. Setting manufacturing goals;
  d. storing a number of annular rings to be used in the conditioner to subdivide the pipe cross-section in the memory;
  e. storing a number of subdivisions for each annular ring and for a central circular passage area of the conditioner in the memory;
  f. setting a width of each annular ring to an initial value in the memory;
  g. setting a width of circular ligaments of the conditioner to an initial value in the memory;
  h. setting a width of subdividing ligaments of the conditioner to an initial value in the memory;
  i. calculating a hydraulic diameter of each of the passages of the conditioner with a computer from information stored in the memory in steps a-g, the computer in communication with the memory;
  j. setting a thickness of the conditioner plate to a value based on a desired ratio of passage length to hydraulic diameter in the memory;
  k. determining resistance and flow characteristics of the conditioner geometry with the computer based on steps a-g and i; and
  l. adjusting the geometry iteratively with the computer until the goals are achieved.

18. The method of claim 17 including the step of setting a pressure loss coefficient of less than 2 in the memory.

19. The method of claim 17 including the step of entering into the memory a target flow profile based on fully developed flow conditions.

20. The method of claim 17 including the step of entering into the memory a flat velocity profile.

21. A flow conditioner for a circular pipe having an axis comprising: a plate having a face to be disposed in the circular pipe with the face of the plate perpendicular to the axis of the pipe, said plate having a central circular passage area through which fluid flows surrounded by two or more concentric arrays of segmented annular passages for fluid flow defined by separating and subdividing ligaments, with at least one array of annular passages having a radial width different than a radial width of a second array of annular passages, the sides of each subdividing ligament are straight and parallel.

* * * * *